Patented Dec. 12, 1933

1,938,945

UNITED STATES PATENT OFFICE 1,938,945

METHOD OF PRODUCING GASOLINE

Cary R. Wagner, Chicago, Ill., assignor to The Pure Oil Company, Chicago, Ill., a corporation of Ohio No Drawing. Original application June 5, 1928, Serial No. 283,145. Divided and this application October 10, 1929. Serial No. 398,811

2 Claims. (Cl. 196—10)

This invention relates to an improved process of manufacturing gasoline-like hydrocarbons from unsaturated hydrocarbon gases, and has for its primary object the provision of a novel method of treating unsaturated hydrocarbons such as ethylene, propylene and butylene, especially hydrocarbons of the ethylene series, whereby to effect the polymerization of such light hydrocarbons for the purpose of securing hydrocarbons of higher molecular weights which have the characteristics of gasoline and are suitable for use as motor fuels. The present application is a division of my prior application relating to the same subject Serial No. 283,145, filed June 5, 1928.

In accordance with the present invention, a body of unsaturated hydrocarbon gases of the character aforesaid and obtained, for example, from pyrogenic treatment of hydrocarbon oils is heated to a temperature in excess of 350° F. but not in excess of 700° F. When so heated the gases are maintained under super-atmospheric pressures varying between 600 to 1500 pounds per square inch or higher. These temperatures and pressures will, of course, vary in accordance with the characteristics of the hydrocarbon compounds under treatment, and for this reason it is practically impossible to give optimum operating conditions of a detailed character. However, for the purpose of the invention it may be stated that the operating temperatures of the gases during the polymerization reactions exceed 350° F. but not in excess of 700° F. and the pressures maintained thereon are in excess of 40 atmospheres but not in excess of 100 atmospheres.

When the gases are thus heated and placed under pressure the same are brought into contact with a catalyst for the purpose of promoting the polymerization reactions. Among the catalysts suitable for the purpose of the invention are partially hydrated silicates and/or silicic acid compounds or other similar substances possessing very extended surfaces which are capable of adsorbing gases in considerable quantity. These substances by selective adsorption give high concentrations locally of these unsaturated gases and thus promote reactions of the desired polymerization type. Activated carbon and charcoals have this property also to a very marked extent. I may also employ as a catalyst and/or adsorbent silica gel, fuller's earth, Death Valley clay, or bentonite, which may be used either alone or in certain instances in combination with one another.

By bringing the hydrocarbon gases of the character set forth under temperature and pressure conditions specified into intimate contact with an adsorbent or catalyst of the type disclosed the unsaturated hydrocarbons such as ethylene, $C_2H_4$, propylene $C_3H_6$, and butylene $C_4H_8$, which have what is known as a double bond, are capable of reacting chemically through polymerization to form additive compounds. By adjusting the temperatures and pressures, according to the composition of the mixture of gases, I provide for the control of the reactions in the formation of additive compounds of higher molecular weight. It is, of course, impossible to set forth the specific temperatures and pressures for all possible combinations of ethylene, propylene, 1-butene, 2-butene and isobutene which may be present, since there are possible many hundreds of different combinations of these hydrocarbons, no two of which would require exactly the same temperature and pressure for most effective operation. The temperatures and pressures above given, however, will enable a skilled worker in the art to readily determine the most efficient conditions. Through the regulation of these conditions the polymerized compounds can be kept at such molecular weights as to render them suitable particularly for use as motor fuels.

Any suitable apparatus may, of course, be used in the heating of the hydrocarbons, in maintaining super-atmospheric pressures thereon and in the matter of bringing these hydrocarbons under the conditions specified into contact with the catalyst. By the present invention a waste product or a product of low economic value may be transformed into a more useful and valuable product.

Hydrocarbons of the ethylene series are developed in larger quantities in certain types of oil cracking systems, especially those systems operating at high temperatures and under low pressures. Usually, in such systems the gases, following condensation, are passed to a compressor system where they are stripped of their more readily condensable products. While a large percentage of gasoline is recovered by this compressor method of abstraction yet there remains a large quantity of fixed gas which has little economic value and is generally used for combustion purposes in oil refineries. In some instances it may be used as an enriching gas to raise the B. t. u. values of water gas in localities where industrial conditions permit of economic transfer of gaseous products. However, by the present invention these heretofore practically worthless gases are transformed into a liquid product having the characteristics of high grade gasoline or motor fuels, and the final product obtained by the present invention is intended chiefly for this usage.

The invention has the advantage of being simple and convenient to operate in commercial installations and the recovery of liquid products obtained thereby renders vapor phase systems of oil conversion more economic from a practical standpoint in that the total percentage of recovered motor fuel of the charging stock employed compares very favorably with the percentage obtained from the well-known liquid phase methods of conversion.

What is claimed is:

1. The continuous process of producing gasoline-like hydrocarbons of relatively higher molecular weight from those of lower molecular weight, which consists in passing unsaturated hydrocarbon gases of the ethylene series including ethylene, propylene and butylene over a catalyzing agent of a solid absorbent while said gases are maintained at a temperature of between 350° F. to 700° F. and at a pressure of between 600 to 1500 pounds per square inch, said catalyzing agent being selected from at least one of a group consisting of fuller's earth, activated charcoal, silica gel, bentonite, partially hydrated silicate, and silicic acid compounds, to form gasoline-like hydrocarbons without substantial cracking, the reaction being exothermic.

2. The continuous process of producing gasoline-like hydrocarbons of relatively higher molecular weight from those of lower molecular weight which consists in passing unsaturated hydrocarbon gases obtained from vapor phase systems of oil conversion over a catalyzing agent of a non-metallic mineral catalyst while said gases are maintained at a temperature of between 350° F. to 700° F. and at a pressure of between 600 to 1500 pounds per square inch, said non-metallic catalyst being selected from any one of a group consisting of fuller's earth, activated charcoal, silica gel, bentonite, partially hydrated silicate, and silicic acid compounds, said catalyst under the conditions of temperature and pressure set forth causing polymerization of said hydrocarbon gases, to form gasoline-like hydrocarbons without substantial cracking, the reaction being exothermic.

CARY R. WAGNER